United States Patent
Park et al.

(10) Patent No.: US 10,211,953 B2
(45) Date of Patent: Feb. 19, 2019

(54) ANTENNA DIVERSITY SCHEMES

(71) Applicant: QUALCOMM Incorporated, San Diego, CA (US)

(72) Inventors: Seyong Park, San Diego, CA (US); Yi Huang, San Diego, CA (US); Wei Zeng, Cupertino, CA (US); Renqiu Wang, San Diego, CA (US); Hao Xu, Beijing (CN); Peter Gaal, San Diego, CA (US); Wanshi Chen, San Diego, CA (US); Naga Bhushan, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/889,436

(22) Filed: Feb. 6, 2018

(65) Prior Publication Data
US 2018/0227081 A1  Aug. 9, 2018

Related U.S. Application Data

(60) Provisional application No. 62/456,052, filed on Feb. 7, 2017.

(51) Int. Cl.
*H04L 1/06* (2006.01)
*H04B 7/06* (2006.01)

(52) U.S. Cl.
CPC .......... *H04L 1/0668* (2013.01); *H04B 7/068* (2013.01); *H04B 7/0613* (2013.01); *H04B 7/0617* (2013.01); *H04L 1/0606* (2013.01)

(58) Field of Classification Search
CPC .......... H04L 1/0668; H04L 2012/2841; H04L 5/0007; H04L 25/0204; H04L 1/0001;
(Continued)

(56) References Cited

U.S. PATENT DOCUMENTS

2008/0130769 A1* 6/2008 Papadopoulos ........ H04B 7/022
375/260
2009/0316807 A1 12/2009 Kim et al.
(Continued)

FOREIGN PATENT DOCUMENTS

WO  2016162174 A1  10/2016

OTHER PUBLICATIONS

Ciochina C et al: "New PAPR-Preserving Mapping Methods for Single-Carrier FDMA with Space-Frequency Block Codes," IEEE Transactions on Wireless Communications, IEEE Service Center, Piscataway, NJ, US, vol. 8, No. 10, Oct. 1, 2009 (Oct. 1, 2009), XP011278534, pp. 5176-5186, ISSN: 1536-1276, DOI: 10.1109/TWC.2009.081231.
(Continued)

*Primary Examiner* — Khanh C Tran
(74) *Attorney, Agent, or Firm* — Patterson & Sheridan, LLP

(57) ABSTRACT

Certain aspects of the present disclosure relate to methods and apparatus for implementing one or more antenna diversity schemes using communications systems operating according to 5G technologies. For example, techniques and apparatus may be provided for employing Alamouti encoding in a time domain for one or more portions of a plurality of modulated symbols associated with a first signal to be transmitted by a first antenna or a second signal to be transmitted by a second antenna to create a first plurality of encoded symbols or a second plurality of encoded symbols with tone-wise Alamouti in the frequency domain.

11 Claims, 21 Drawing Sheets

(58) Field of Classification Search
CPC ... H04L 27/26; H04L 27/2627; H04B 7/0669; H04B 1/0483; H04B 7/02; H04B 7/0697
See application file for complete search history.

(56) References Cited

U.S. PATENT DOCUMENTS

| | | | | |
|---|---|---|---|---|
| 2010/0220809 | A1* | 9/2010 | Zhou | H04J 11/0033 375/295 |
| 2010/0278277 | A1* | 11/2010 | Park | H04L 1/0631 375/267 |
| 2013/0136071 | A1* | 5/2013 | Han | H04L 5/0019 370/329 |
| 2016/0261318 | A1* | 9/2016 | Ko | H04B 7/0417 |
| 2016/0379656 | A1* | 12/2016 | Baeckstroem | G10L 19/07 704/219 |
| 2017/0019288 | A1 | 1/2017 | Sagong et al. | |
| 2017/0085308 | A1 | 3/2017 | Sun et al. | |
| 2017/0264351 | A1 | 9/2017 | Lomayev et al. | |
| 2017/0288926 | A1 | 10/2017 | Zhao et al. | |

OTHER PUBLICATIONS

International Search Report and Written Opinion—PCT/US2018/017267—ISA/EPO—dated May 8, 2018.

Mitsubishi Electric: "PAPR Preserving SFBC for DFTsOFDM", 3GPP Draft; R1-1701925-RAN188-UL TXD_Mitsubishi, 3rd Generation Partnership Project (3GPP), Mobile Competence Centre; 650, Route Des Lucioles; F-06921 Sophia-Antipolis Cedex ; France, vol. RAN WG1, No. Athens, Greece; Feb. 13, 2017-Feb. 17, 2017, Feb. 6, 2017 (Feb. 6, 2017), XP051220241, 12 pages, Retrieved from the Internet: URL:http://www.3gpp.org/ftp/tsg_ran/WG1_RL1/TSGR1_88/Docs/ [retrieved on Feb. 6, 2017].

Qualcomm Incorporated: "UL Transmit Diversity for PUCCH", 3GPP Draft; R1-1700825 UL Transmit Diversity for PUCCH, 3rd Generation Partnership Project (3GPP), Mobile Competence Centre; 650, Route Des Lucioles; F-06921 Sophia-Antipolis Cedex; France, vol. RAN WG1, No. Spokane, U.S.A; Jan. 16, 2017-Jan. 20, 2017, Jan. 16, 2017 (Jan. 16, 2017), XP051208344, pp. 1-6, Retrieved from the Internet: URL:http://www.3gpp.org/ftp/Meetings_3GPP_SYNC/RAN1/Docs/ [retrieved on Jan. 16, 2017].

* cited by examiner

Ant1 $\quad$ $t_0, t_1, t_2, t_3,$ $t_4, t_5, t_6, t_7$

Ant2 $\quad$ $t_7^*, -t_6^*, t_5^*, -t_4^*,$ $t_3^*, -t_2^*, t_1^*, -t_0^*$

FIG. 14

Time Domain

Ant 1  $t_0, t_1, t_2, t_3, t_4, t_5, t_6, t_7$

Ant 2  $t_7^*, -t_6^*, t_5^*, -t_4^*, t_3^*, -t_2^*, t_1^*, -t_0^*$

Freq Domain

Ant 1  $s_0, s_1, s_2, s_3, s_4, s_5, s_6, s_7$

Ant 2  $-s_4^*, -s_5^* e^{j(2\pi/8)}, -s_6^* e^{j(4\pi/8)}, -s_7^* e^{j(6\pi/8)}, s_0^*, s_1^* e^{-j(2\pi/8)}, s_2^* e^{-j(4\pi/8)}, s_3^* e^{-j(6\pi/8)}$

Freq Domain after introducing Phase Ramp for later Half of tones

Ant 1  $\boxed{s_0, s_1, s_2, s_3}$ $\boxed{s_4, s_5 e^{-j(2\pi/8)}, s_6 e^{-j(4\pi/8)}, s_7 e^{-j(6\pi/8)}}$ Ant 2  $\boxed{-s_4^*, -s_5^* e^{j(2\pi/8)}, -s_6^* e^{j(4\pi/8)}, -s_7^* e^{j(6\pi/8)}}$ $\boxed{s_0^*, s_1^*, s_2^*, s_3^*}$ Therefore, we have a tone-wise Alamouti in Freq domain

FIG. 16

| DFT | $h_1 s_0$ | $h_2(-s_4^*)$ |
|---|---|---|
| | $h_1 s_1$ | $h_2(-s_5^* e^{j(2\pi/8)})$ |
| | $h_1 s_2$ | $h_2(-s_6^* e^{j(4\pi/8)})$ |
| | $h_1 s_3$ | $h_2(-s_7^* e^{j(6\pi/8)})$ |
| | $h_1 s_4$ | $h_2 s_0^*$ |
| | $h_1 s_5$ | $h_2 s_1^* e^{j(2\pi/8)}$ |
| | $h_1 s_6$ | $h_2 s_2^* e^{j(4\pi/8)}$ |
| | $h_1 s_7$ | $h_2 s_3^* e^{j(6\pi/8)}$ |

FIG. 18

Ant1  $t_0, t_1, t_2, t_3, t_4, t_5, \ldots, t_{2n-1}$

Ant2  $t^*_{2n-1}, \ldots, -t^*_6, t^*_5, -t^*_4, t^*_3, -t^*_2, t^*_1, -t^*_0$

FIG. 21

$$\begin{array}{c|ccc}
\text{DFT} & h_1 s_0 & h_2(-s_n^*) & \\
& h_1 s_1 & h_2(-s_{n+1}^* e^{j(2\pi/2n)}) & \\
& \ldots & \ldots & \\
& h_1 s_{n-1} & h_2(-s_{2n-1}^* e^{j(6\pi/2n)}) & \\
& h_1 s_n \quad + & h_2 s_0^* & \times 1 \\
& h_1 s_{n+1} & h_2 s_1^* e^{j(2\pi/2n)} & \times e^{-j(2\pi/2n)} \\
& \ldots & \ldots & \times e^{-j(2\pi/2n)} \\
& h_1 s_{2n-1} & h_{n-1} s_3^* e^{j(6\pi/2n)} & \times e^{-j(2\pi/2n)}
\end{array}$$

FIG. 22

ANTENNA DIVERSITY SCHEMES

CLAIM OF PRIORITY UNDER 35 U.S.C. § 119

The present Application for Patent claims benefit of U.S. Provisional Patent Application Ser. No. 62/456,052, filed Feb. 7, 2017, assigned to the assignee hereof and hereby expressly incorporated by reference herein.

BACKGROUND

Field of the Disclosure

The present disclosure relates generally to communication systems, and more particularly, to methods and apparatus for implementing one or more antenna diversity schemes using communications systems operating according to 5G technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a 5G base station (5G NB), a new radio base station (NR BS), a 5G node-B (5G NB), a new radio node-B (NR NB), a network node, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. 5G is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in 5G technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Devices in a wireless network may propose communicating using a known uplink antenna diversity scheme. However, drawbacks of such a proposal may include a discontinuous index and/or a discontinuous phase. As a result, such proposals may not provide tone-wise Alamouti in the frequency domain Thus, aspects of the present disclosure present techniques for providing time-domain sample wise Alamouti. Accordingly, in some cases, providing such a diversity scheme may provide continuous index and phase, and may therefore achieve tone-wise Alamouti in the frequency domain.

Certain aspects provide a method for wireless communication. The method generally includes providing a first signal configured to be transmitted by a first antenna and a second signal configured to be transmitted by a second antenna, and encoding the second signal in a time domain that provides a tone-wise Alamouti signal in a frequency domain.

In accordance with one or more cases, the method may further include encoding the second signal with a continuous index and continuous phase that provides for the tone-wise Alamouti in the frequency domain. In accordance with one or more cases, the method may further include flipping an order of the symbols in the second signal, conjugating the second signal, and phase rotating every other symbol in the second signal by 180 degrees. Numerous other aspects are provided.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 14 illustrates an example of time domain signals each made up of a plurality of symbols, in accordance with aspects of the present disclosure.

FIG. 16 illustrates an example of time domain signals and corresponding frequency domain signals, in accordance with aspects of the present disclosure.

FIG. 18 illustrates an example of frequency domain signals at a receiver side of a wireless system, in accordance with aspects of the present disclosure.

FIG. 21 illustrates an example of time domain signal schemes, in accordance with aspects of the present disclosure.

FIG. 22 illustrates an example of frequency domain signals at a receiver side of a wireless system, in accordance with aspects of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
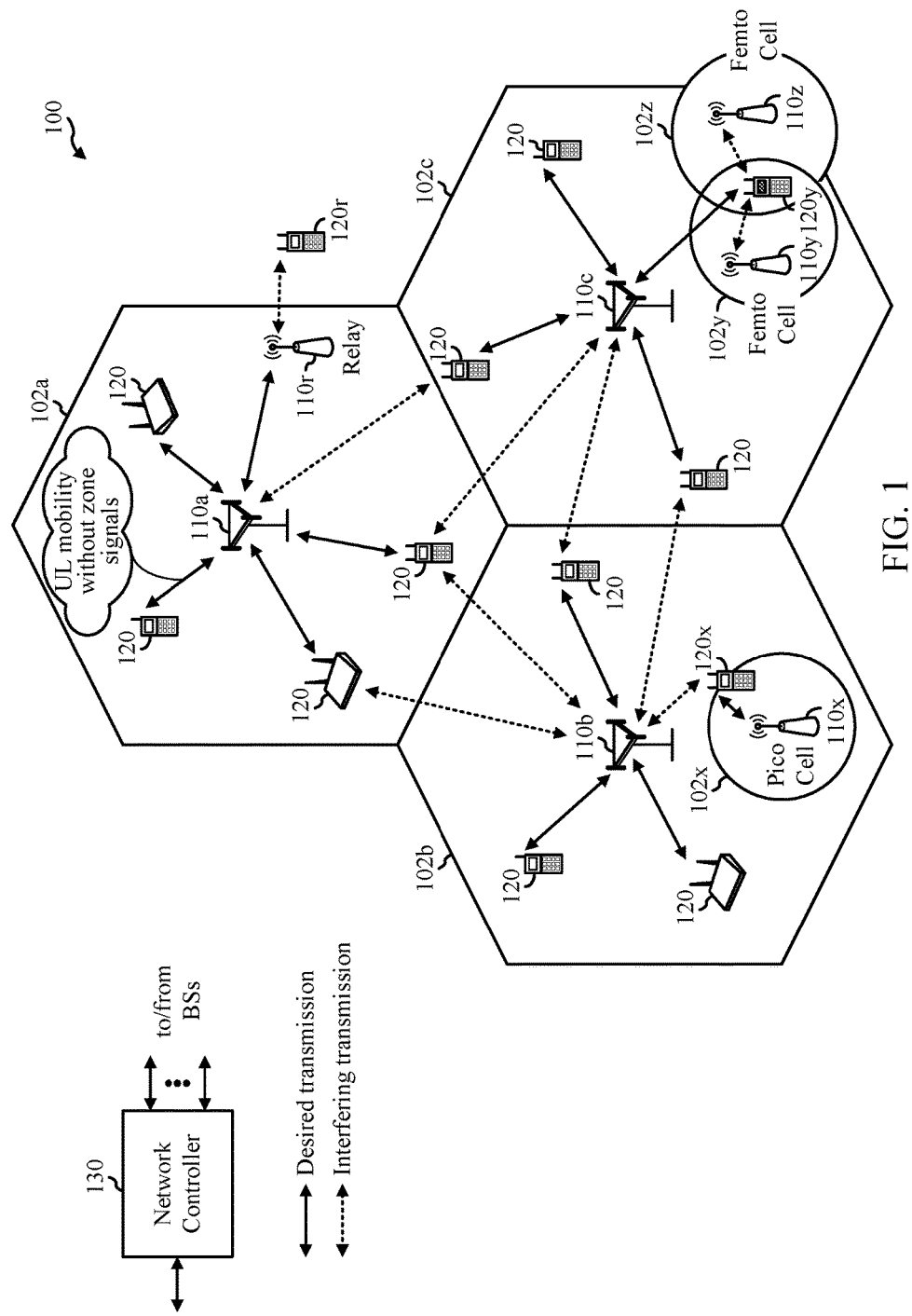
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as 5G (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 5G is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR or 5G systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.).

A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR or 5G. 5G may utilize OFDM with a CP on the uplink and downlink and include support for half-duplex operation using time division duplex (TDD). A single component carrier bandwidth of 100 MHz may be supported. 5G resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for 5G may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based. 5G networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR or 5G cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
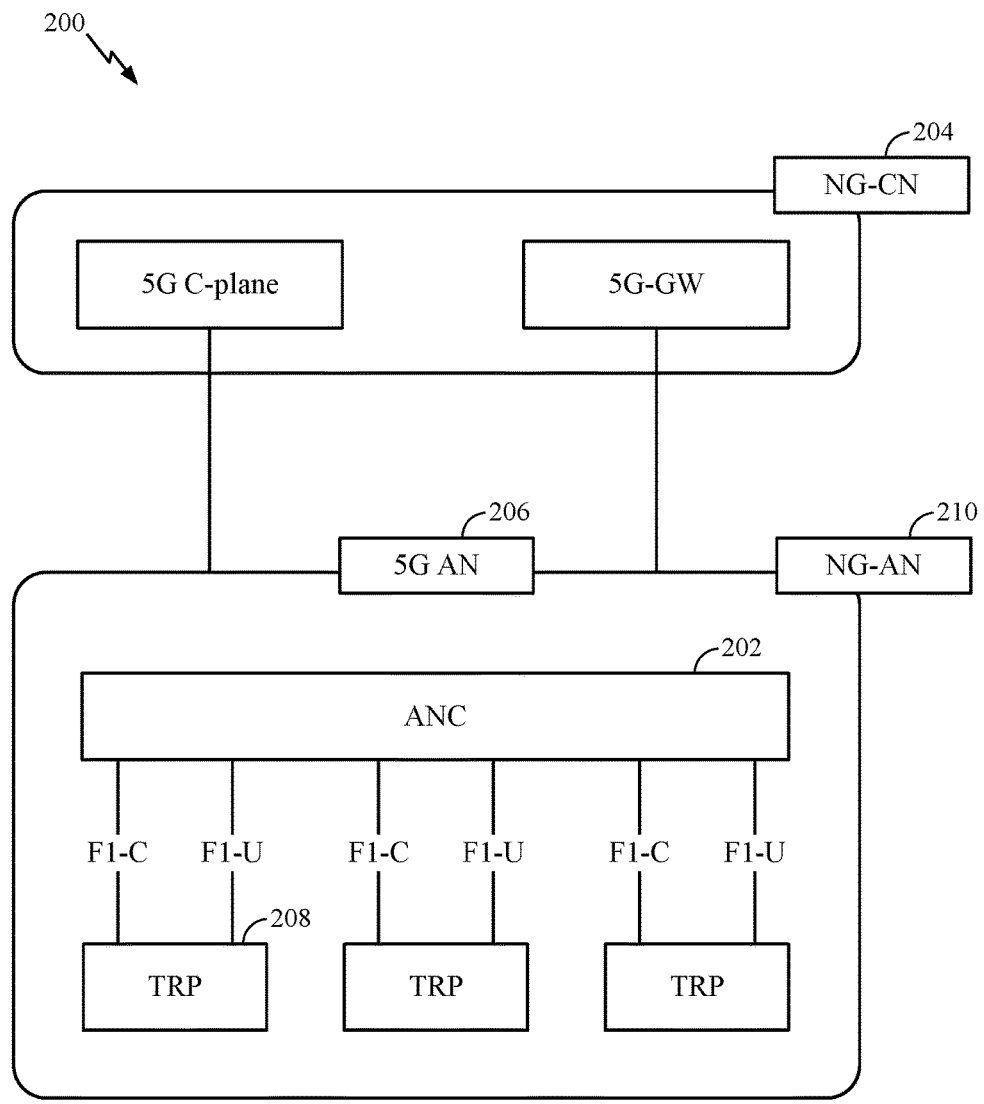
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR or 5G. The NG-AN may share a common fronthaul for LTE and 5G.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
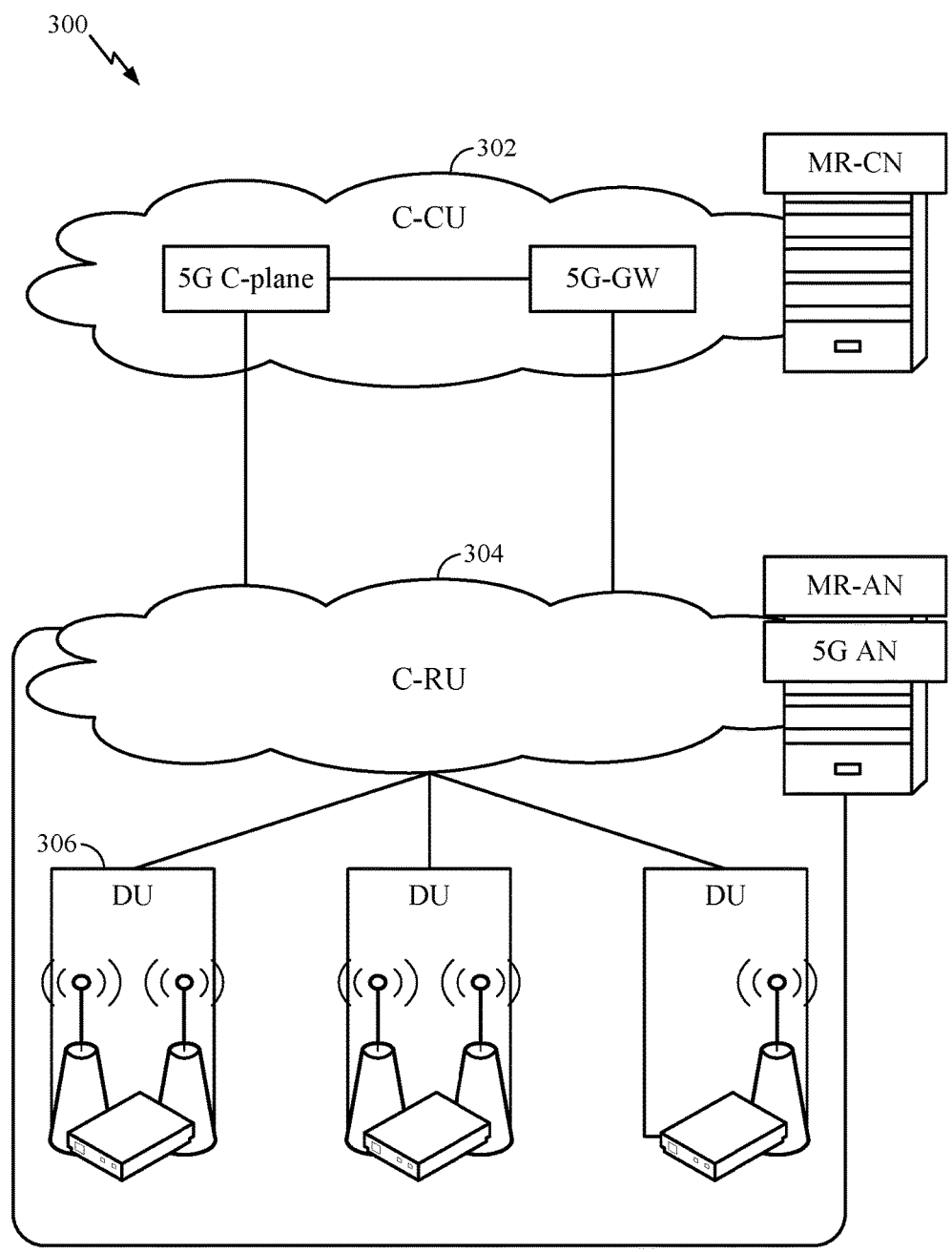
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
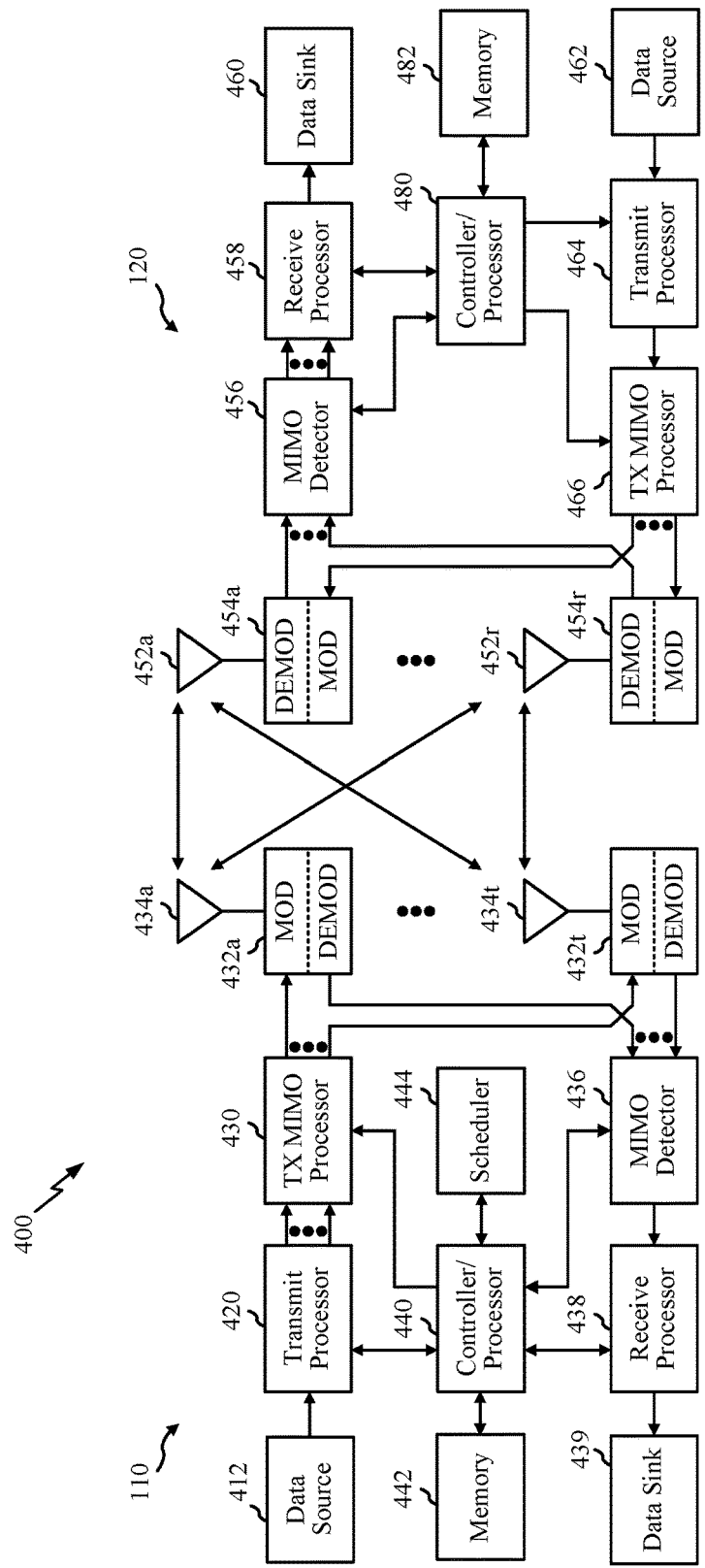
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 13, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
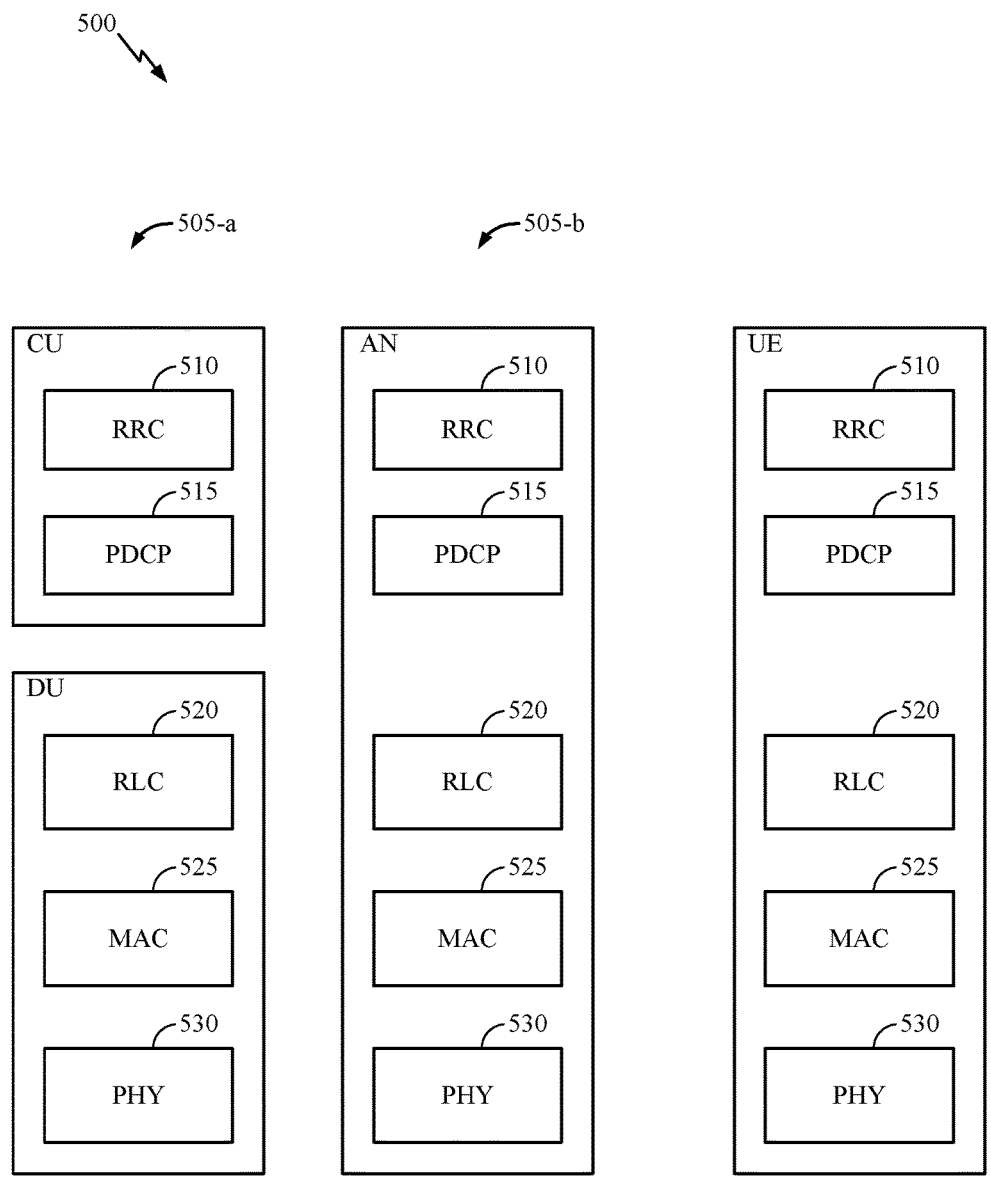
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
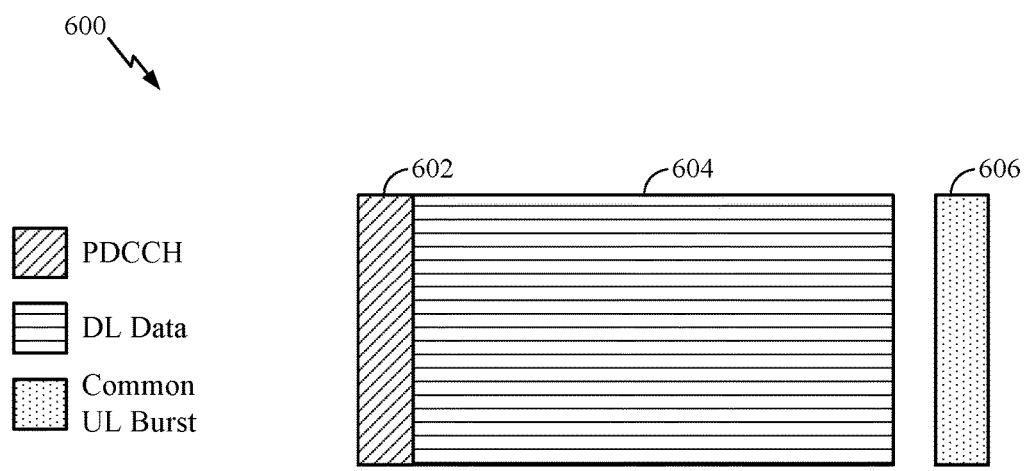
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
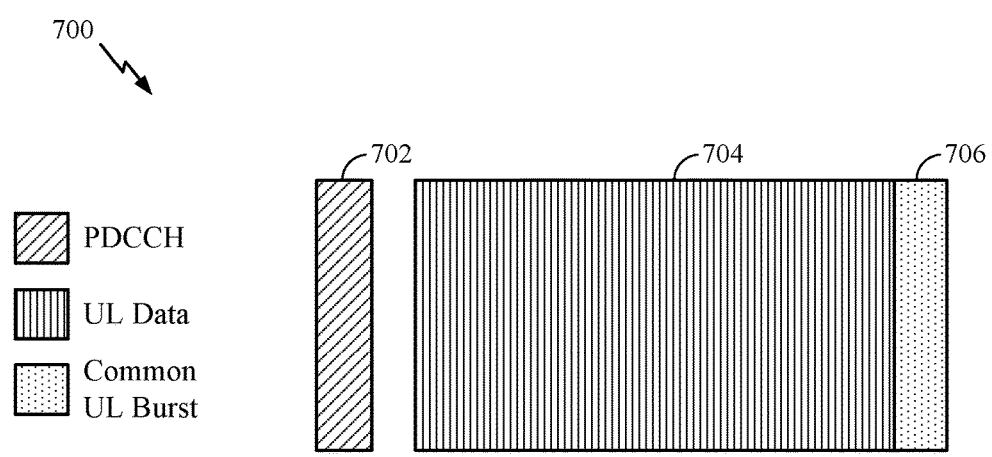
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Examples of Multiple Antenna Transmission

Figure 8:
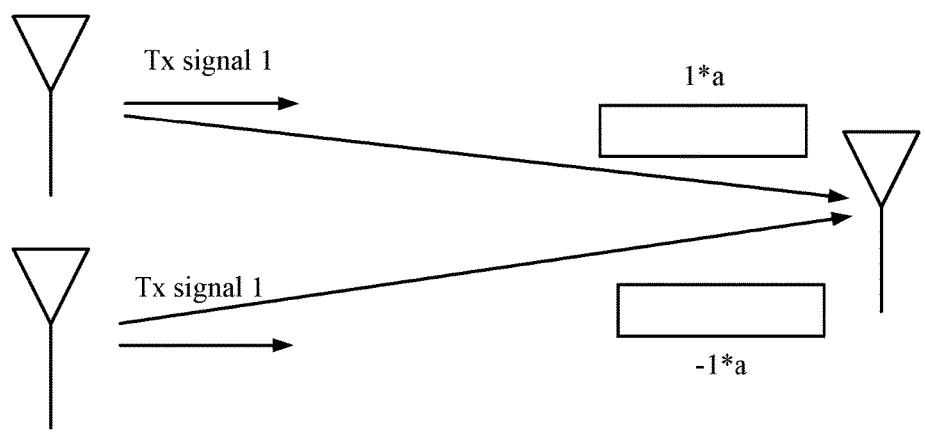
FIG. 8 illustrates an example of a wireless system that includes two transmission antennas and a reception antenna, in accordance with aspects of the present disclosure.

FIG. 8 illustrates an example of a wireless system that includes two transmission antennas and a reception antenna, in accordance with aspects of the present disclosure. As shown, a first antenna transmits a first signal, Tx signal 1. Further, a second antenna is shown transmitting a second copy of the same signal, Tx signal 1. As shown, these signals are received at a reception antenna. Specifically, as shown, Tx signal 1 may be received at the reception antenna conjugated, as represented by '*', as well as combined with a channel value 'a'. The second antenna's transmission of the signal, Tx signal 1, may be received by the reception antenna also conjugated and carrying the channel value 'a' along with also being phase rotated, which can commonly be called making the signal 'negative'.

In larger system that may include additional transmission antennas, for example four, one or more transmission schemes may be implement to help facilitate reception of the signal. For example, the larger system may introduce a small delay between transmitted signals. A specific example of this would be a system that implements a Cyclic Delay Diversity (CDD) scheme. Another option that the larger system may implement may include antenna selection to reduce the total number of antenna transmitting at a specific time down to, for example, two antennas. For cases that have two antennas transmitting, such system may implement the use of an Alamouti scheme, even in the case where there are more than two physical antennas.

Figure 9:
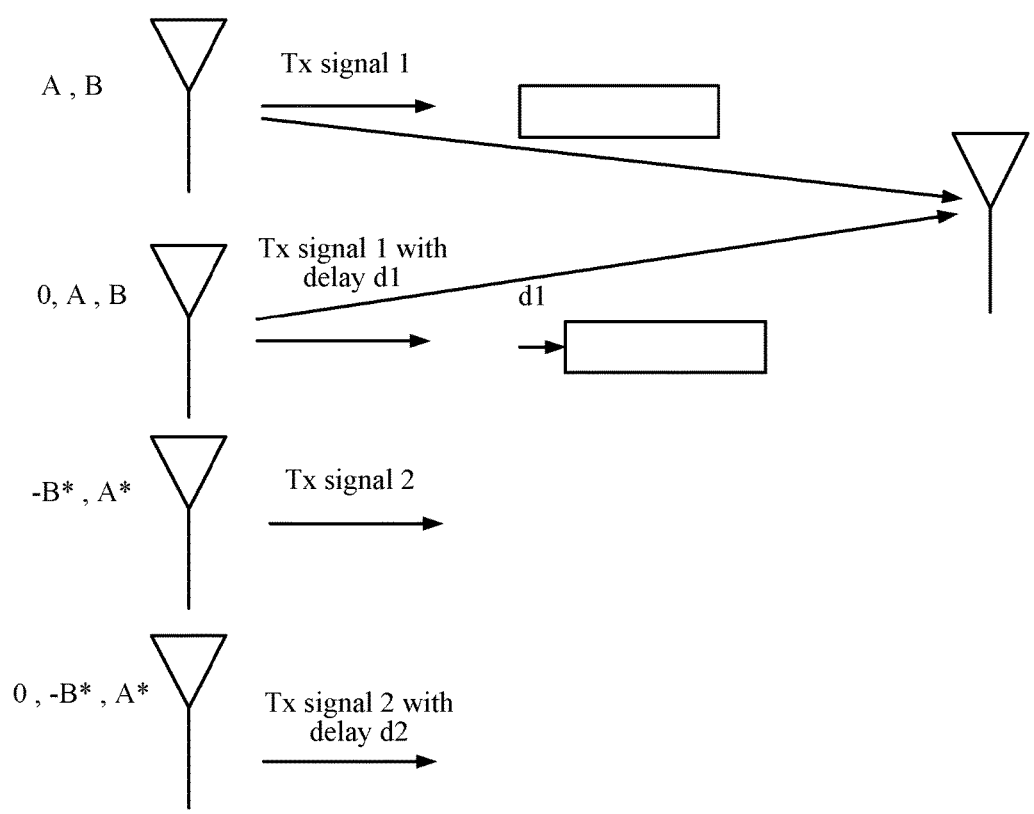
FIG. 9 illustrates an example of a wireless system that includes multiple transmission antennas and a reception antenna, in accordance with aspects of the present disclosure.

For example, FIG. 9 illustrates a wireless system that includes multiple transmission antennas and a reception antenna, in accordance with aspects of the present disclosure. As shown, a first antenna transmits a first signal, Tx signal 1 that includes at least two symbols A and B, toward the reception antenna. A second antenna is shown transmitting the same Tx signal 1 with a delay d1 and including symbols 0, A, and B. A third antenna is shown transmitting as second signal, Tx signal 2. Tx signal 2 includes symbols −B* and A* where represents signal symbol conjugation into, for example, the frequency domain, and the '−' represents the symbol being phase rotated, for example, being phase rotated by 180 degrees, which can commonly be called making the signals symbol 'negative'. FIG. 9 also shows a fourth antenna transmitting the second signal, Tx signal 2, with a delay d2 and including symbols 0, −B*, and A*.

It may be appreciated, from that which is shown in FIG. 9, that by using signal delay and one or more other schemes the complex signal transmission may be reduced from a scenario with all four antennas transmitting competing signals down to two antennas. This two antenna reduction still leaves scenarios open on how to handle generating the two signals that are to be transmitted on the two antennas even in the reduced state. Specifically, as shown in FIG. 9 a small delay CDD may be introduced by explicit time delay as shown in the figure. Alternatively, a Small delay CDD may be introduced by phase ramp in the frequency (before an IFFT in OFDM waveform generation.

Figure 10:
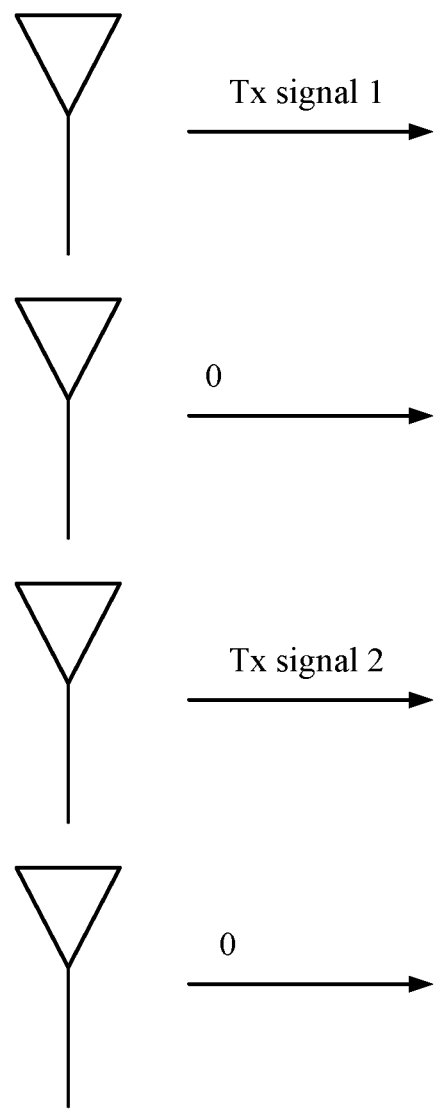
FIG. 10 illustrates an example of a wireless system that includes multiple transmission antennas, in accordance with aspects of the present disclosure.

FIG. 10 illustrates an example of a wireless system that includes multiple transmission antennas, in accordance with aspects of the present disclosure. Specifically, FIG. 10 shows an example scenario of antenna selection. As shown, a first antenna transmits a first signal, Tx signal 1, and a third antenna transmits a second signal Tx signal 2. Thus, it is clear that the first and third antennas have been selected in this example. This leaves a second antenna and a fourth antenna which are shown not transmitting or transmitting a zero/null signal.

So, even though in a scenario where one has four antennas, the scenario may be reduced such that one has only to consider how to generate two signals. In this example, the antennas may be carefully selected by taking into consideration the channel to the reception (Rx) antenna and/or channel conditions. In one or more examples, one may round robin different combinations of two antennas out of the four possible antennas. In one or more examples, one may measure a downlink channel and choose the antenna with high energy based on reciprocity.

Figure 11:
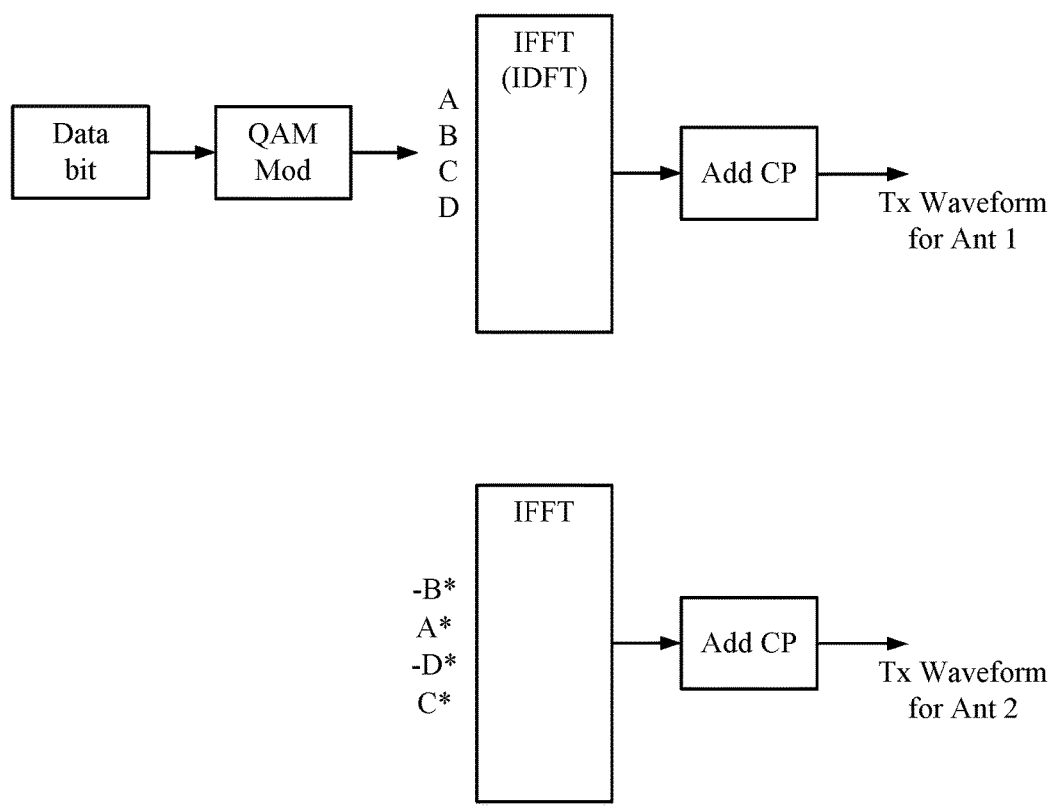
FIG. 11 illustrates an example of a processing path of data through multiple elements of a wireless system that includes orthogonal frequency-division multiplexing (OFDM).

FIG. 11 illustrates an example of a processing path of data through multiple elements of a wireless system that includes orthogonal frequency-division multiplexing (OFDM).

As shown, signal bits or symbols (A, B, C, D), of a signal may pass through a QAM mod, then an IFFT (IDFT), and have CP added, and then the resulting waveform transmitted to a first Antenna (Ant 1) for transmission. In parallel, a second signal including symbols −B*, A*, −D*, and C* may be passed through elements including an IFFT and CP addition, and transmitted to a second Antenna (Ant 2) for transmission. In this example it may be appreciated that in the frequency domain Alamouti properties are provided for the OFDM waveform. However, due to OFDM waveform properties a large Peak-to-Average Power Ratio (PAPR) may be included as a property of the transmitted signal.

Figure 12:
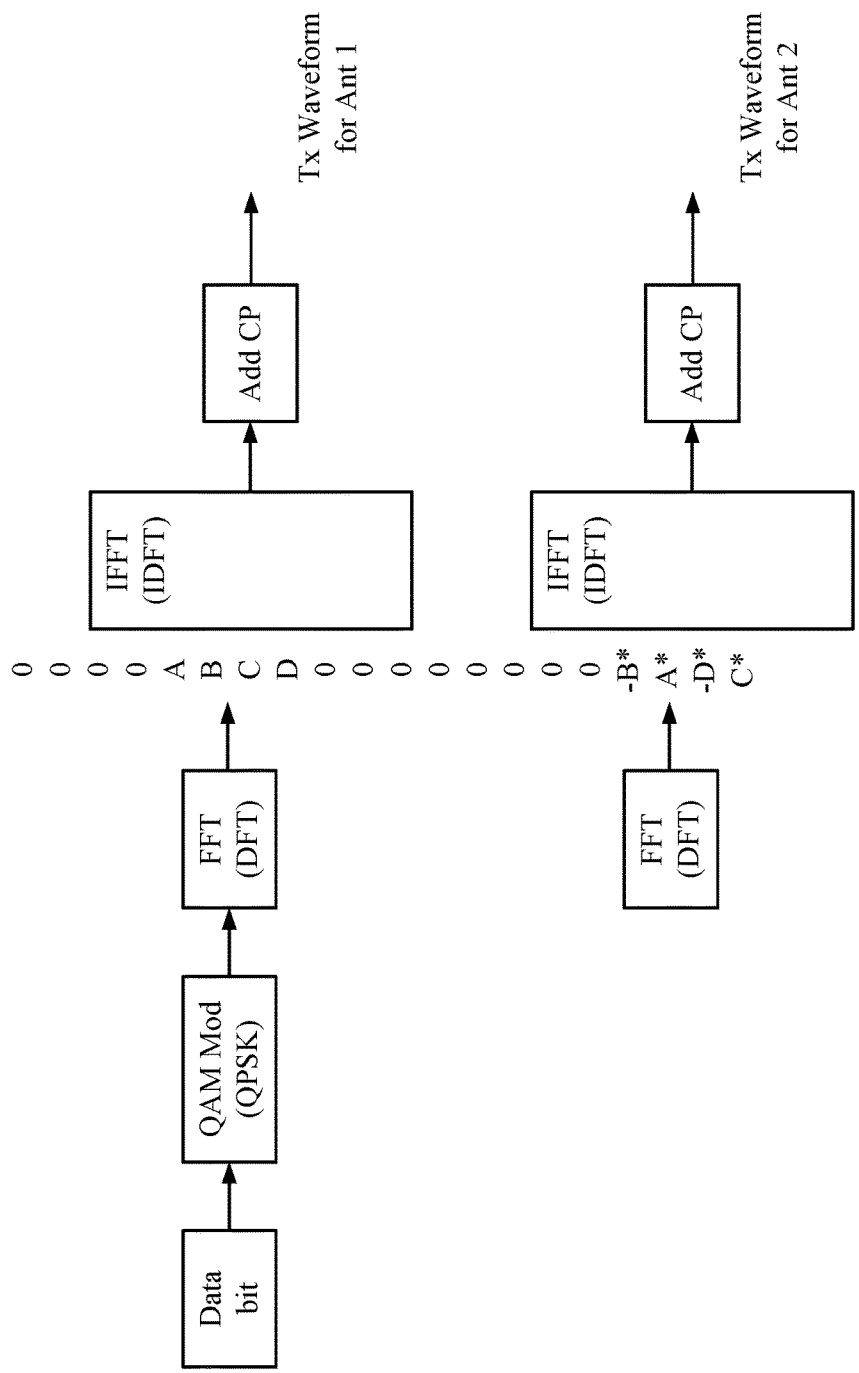
FIG. 12 illustrates a processing path of data through multiple elements of a wireless system that includes DFT spread orthogonal frequency-division multiplexing (DFT-s-OFDM).

FIG. 12 illustrates a processing path of data through multiple elements of a wireless system that includes DFT spread orthogonal frequency-division multiplexing (DFT-s-OFDM).

As shown, a first signal that includes symbols A, B, C, and D is processed through the system as shown and a resulting waveform of the signal is transmitted to a first antenna (Ant 1) for transmission. In parallel a second signal including symbols −B*, A*, −D*, and C* is processed through the system and a resulting waveform of this second signal is transmitted to a second antenna (Ant 2) for transmission.

In this approach as shown in FIG. 12, frequency domain Alamouti for DFT-s-OFDM waveform is provided and the system may also achieve antenna diversity. However, the second antenna does not have a low PAPR property because it is not an output from FFT logic.

Example of Antenna Diversity Scheme Using Alamouti

In accordance with one or more aspects of embodiments described herein, antenna diversity using Alamouti (Space Diversity) is provided along with low PAPR (peak-to-average ratio) waveforms by DFT-s-OFDM.

Figure 13:
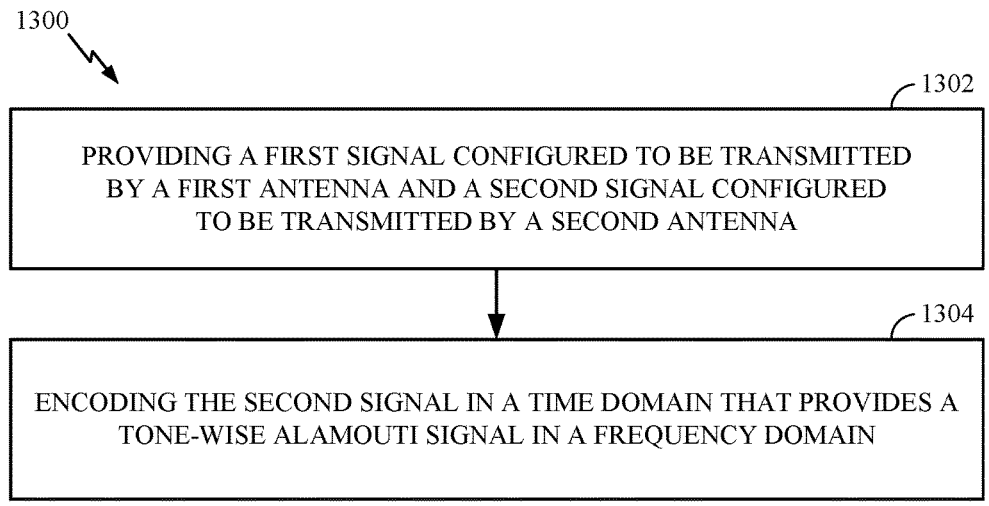
FIG. 13 illustrates example operations for wireless communications, in accordance with aspects of the present disclosure.

For example, FIG. 13 illustrates operations 1300 for wireless communications, in accordance with aspects of the present disclosure.

Specifically, operations 1300 begin, at block 1302, with providing a first signal configured to be transmitted by a first antenna and a second signal configured to be transmitted by a second antenna. For example, the first signal may be processed and then transmitted via the first antenna. Specifically the signal transmitted via first antenna may begin with a time domain signal that includes symbols t0, t1, t2, t3, t4, t5, t6, and t7. This represents the signal before FFT processing.

The operations 1300 also provide, at block 1304, encoding the second signal in the time domain that provides a tone-wise Alamouti signal in the frequency domain. For example, the second signal may include symbols t7*, −t6*, t5*, −t4*, t3*, −t2*, t1*, and −t0*. This example shows a time-domain sample wise Alamouti (e.g., Alamouti encoded symbols). Further, it may be appreciated that these signals both provide a continuous index (0 through 7 and 7 through 0) and a same phase. The flipping of a symbol sign to '−' is equal to a phase rotation by 180 degree. It may be appreciated that a phase rotation in the time domain provides a shift in the frequency domain. Accordingly, this example may achieve tone-wise Alamouti in the frequency domain.

Figure 13A:
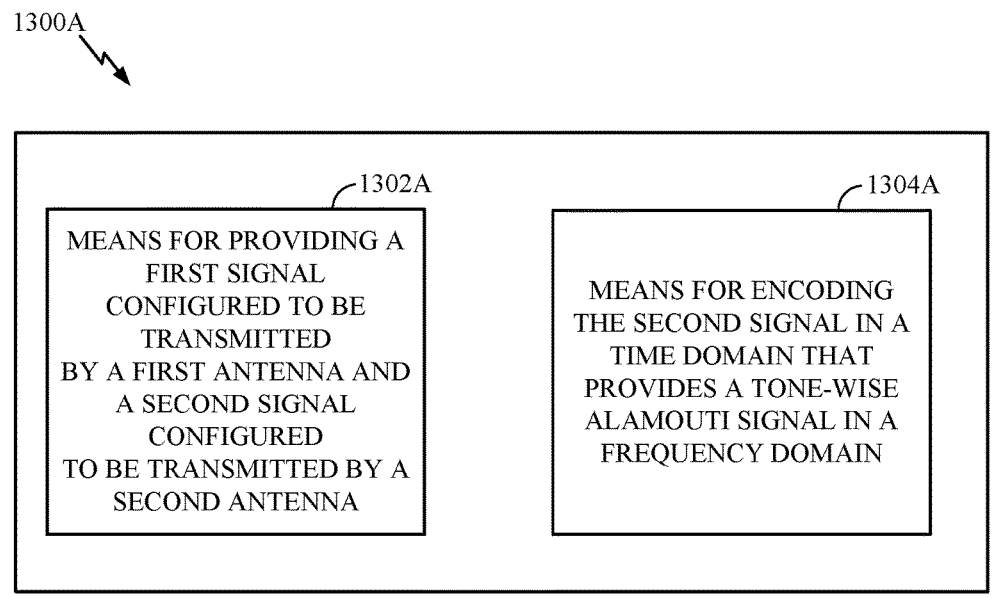
FIG. 13A illustrates a communication device illustrating means for performing operations for wireless communications, according to certain aspects of the present disclosure.

FIG. 13A illustrates a communication device 1300A illustrating means for performing operations for wireless communications, according to certain aspects of the present disclosure.

FIG. 13A illustrates a communications device 1300A that may include various means-plus-function components configured to perform the operations illustrated in FIG. 13. For example, at 1302A, the communications device 1300A includes means for performing the operations illustrated at 1302 in FIG. 13. Additionally, at 1304A, the communications device 1300A includes means for performing the operations illustrated at 1304 in FIG. 13.

Aspects of the present disclosure provide techniques and apparatus for encoding the second signal with a continuous index and continuous phase that provides for the tone-wise Alamouti in the frequency domain. In accordance with one or more aspects, the operations may include rearranging (flipping) an order of the symbols in the second signal, conjugating the second signal, and phase rotating every other symbol in the second signal by 180 degrees.

In accordance with one or more cases, the method of wireless communication may include employing Alamouti encoding in a time domain for one or more portions of a plurality of modulated symbols associated with a first signal to be transmitted by a first antenna and a second signal to be transmitted by a second antenna to create a first plurality of encoded symbols and a second plurality of encoded symbols, retaining sequential symbol order (e.g., a reversed ordering of the symbols) for the second plurality of encoded symbols, and employing a constant phase rotation for the second plurality of encoded symbols.

In one or more cases, the method may further include transmitting the first signal based on the first plurality of encoded symbols from the first antenna, and transmitting the second signal based on the second plurality of modulated symbols from the second antenna. According to one or more aspects, the plurality of modulated symbols is based on a constellation, and the constellation is selected from a group that includes at least QAM and PSK. According to other aspects each one of the plurality of modulated symbols are each based on a different constellation, and the constellation is selected from a group that includes at least pi/2-BPSK and pi/4-QPSK. According to one or more cases, the method may further include employing at least one of 4-QAM or QPSK to create the plurality of modulated symbols. According to other aspects, the plurality of modulated symbols may be modulated using any modulation scheme (e.g., QAM, QPSK, BPSK scheme), wherein the constellation used for a modulated symbol is selected from a group including pi/N, where N is an integer. In this manner, in aspects, a low PAPR (peak-to-average ratio) waveform may be formed.

In accordance with one or more cases, the method of wireless communication may include selecting at least two antennas of a user equipment having more than two antennas to transmit a first signal and a second signal respectively, and employing Alamouti encoding to create a plurality of encoded symbols associated with the first signal to be transmitted by a first antenna of the at least two antennas and a plurality of encoded symbols associated with a second signal to be transmitted by a second antenna of the at least two antennas.

In one or more cases, selecting at least two antennas of a user equipment having more than two antennas to transmit a first signal and a second signal includes selecting based on channel qualities associated with the more than two antennas, respectively. According to one or more aspects, the method may further include transmitting the first signal using the first antenna, transmitting the second signal using the second antenna, transmitting a third signal using a third antenna of the more than two antennas, wherein the third signal is a version of the first signal with a first cyclic shift, and transmitting a fourth second signal using a fourth antenna of the more than two antennas, wherein the fourth signal is a version of the second signal with a second cyclic shift.

FIG. 14 illustrates an example of time domain signals each made up of a plurality of symbols, in accordance with aspects of the present disclosure.

Specifically, in accordance with one or more aspects, a first signal that is to be processed and then transmitted by a first antenna (Ant 1) is shown. Specifically the first antenna (Ant 1) may begin with a time domain signal that includes symbols t0, t1, t2, t3, t4, t5, t6, and t7. This representation shows the signal before arriving at an FFT of the system.

Also shown in a second signal that is to be processed and then transmitted by a second antenna (Ant 2). The second signal includes symbols t7*, −t6*, t5*, −t4*, t3*, −t2*, t1*, and −t0*. This example shows a time-domain sample wise Alamouti (e.g., Alamouti encoded symbols). Further, it may be appreciated that these signals both provide a continuous index (0 through 7 and 7 through 0) and a same phase. The flipping of a symbols sign to '−' is equal to a phase rotation by 180 degree. It may be appreciated that a phase rotation in the time domain provided a shift in the frequency domain. Due to at least these property, embodiments described herein may achieve tone-wise Alamouti in the frequency domain.

Figure 15:
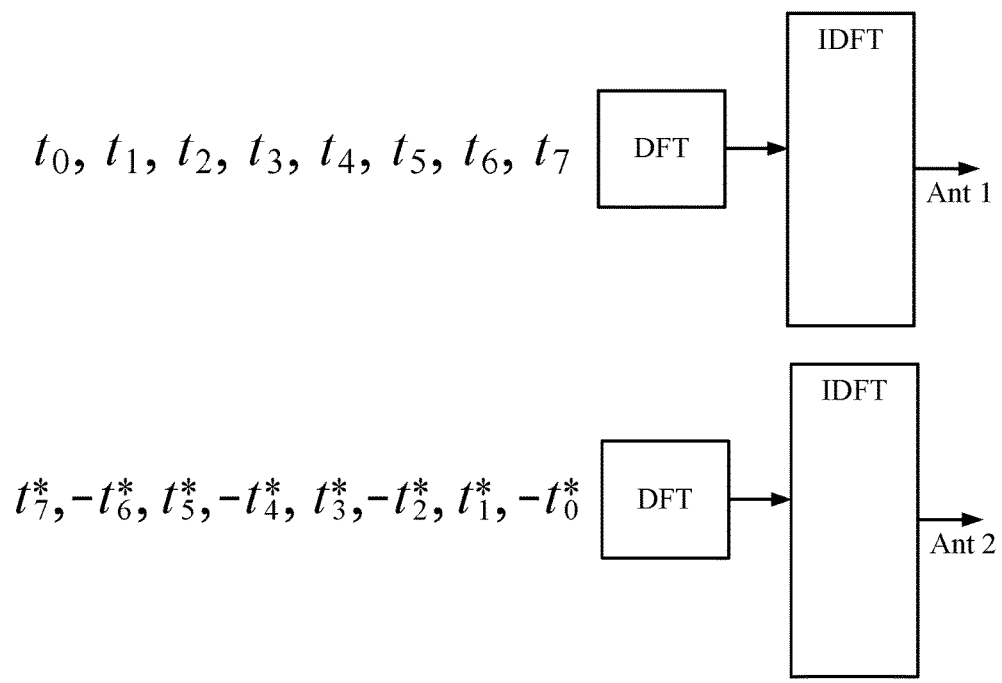
FIG. 15 illustrates an example of time domain signals being input to a wireless system that include DFT-s-OFDM, in accordance with aspects of the present disclosure.

FIG. 15 illustrates an example of time domain signals being input to a wireless system that include DFT-s-OFDM, in accordance with aspects of the present disclosure. Specifically as shown a wireless system may include a first DFT and IDFT connected to a first antenna (Ant 1) and a second DFT and IDFT connected to a second antenna (Ant 2). FIG. 15 shows the first signal that includes symbols t0, t1, t2, t3, t4, t5, t6, and t7 being provided at a the first DFT and IDFT and first antenna. Additionally, the second signal that includes symbols t7*, −t6*, t5*, −t4*, t3*, −t2*, t1*, and −t0* is provided at the second DFT and IDFT and second antenna.

Antenna diversity (e.g., Space Diversity) using Alamouti coding may be provided using this arrangement and scheme. Additionally, a low PAPR (peak-to-average ratio) waveform by DFT-s-OFDM may also be provided using this arrangement and scheme as shown in FIG. 15.

FIG. 16 illustrates an example of time domain signals and corresponding frequency domain signals, in accordance with aspects of the present disclosure.

As shown time domain signals for a first antenna and a second antenna for transmission is shown. Specifically, a first signal that includes symbols t0, t1, t2, t3, t4, t5, t6, and t7 and a second signal that includes symbols t7*, −t6*, t5*, −t4*, t3*, −t2*, t1*, and −t0* are shown. These two signals may be provided in the frequency domain as shown. Particularly, the frequency domain signal for antenna 1 is shown along with the frequency domain signal for antenna 2. Further, FIG. 16 also shows frequency domain signals after introducing a phase ramp for later half of tones. Specifically, FIG. 16 shows a frequency domain phase ramped signal for the first antenna (Ant 1) and a frequency domain phase ramped signal for the second antenna (Ant 2). As may be appreciated, these signals may provide a tone-wise Alamouti in the frequency domain.

Figure 17:
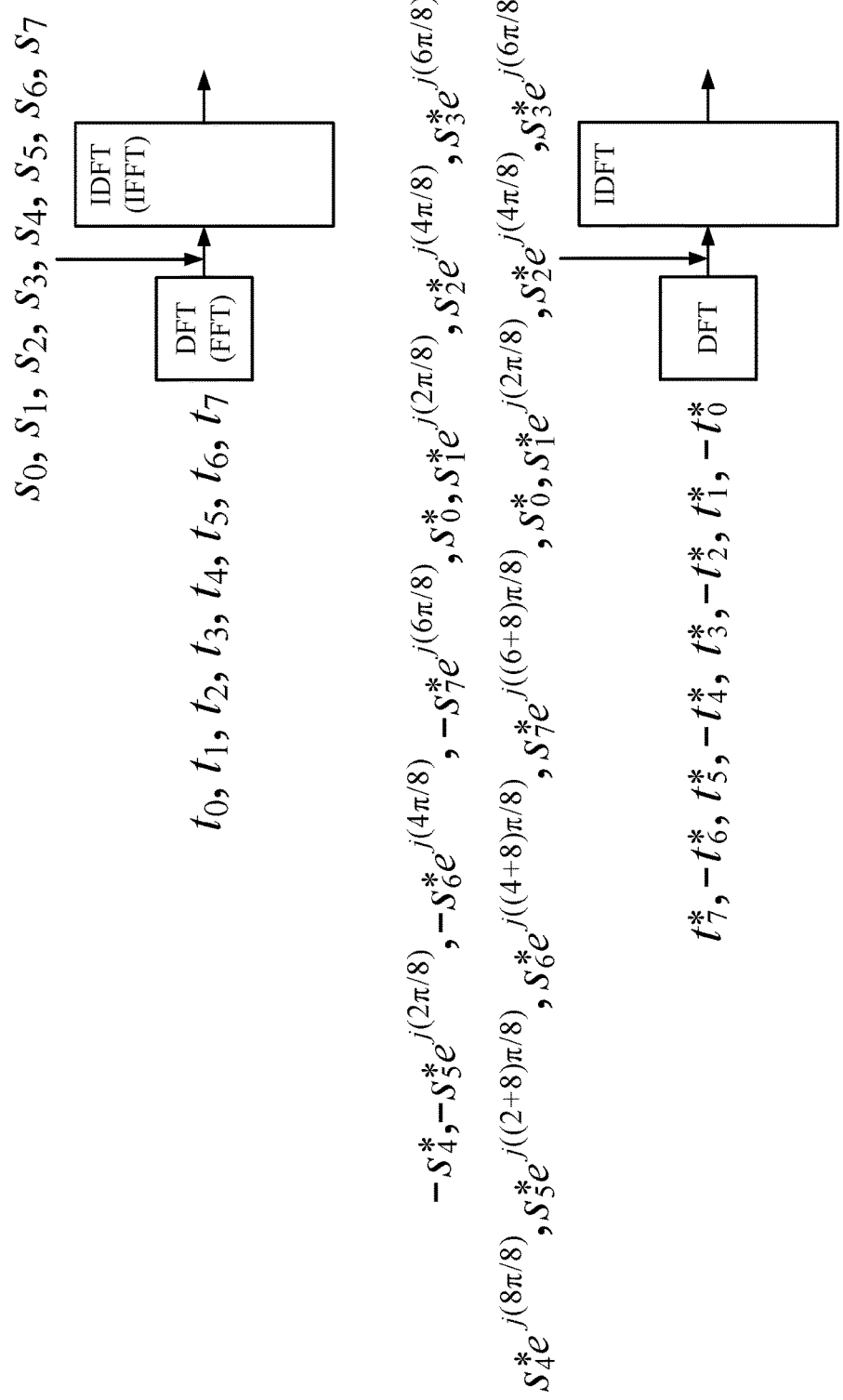
FIG. 17 illustrates an example of corresponding time and frequency domain signals in a transmitting wireless system, in accordance with aspects of the present disclosure.

FIG. 17 illustrates an example of corresponding time and frequency domain signals in a transmitting wireless system, in accordance with aspects of the present disclosure. Similar to FIG. 15, FIG. 17 shows the first and second signal being provided the transmitting wireless system for respective transmission from a first and second antenna (Ant 1 and Ant 2). The first antenna chain is shown receiving a first signal that includes symbols t0, t1, t2, t3, t4, t5, t6, and t7. The second antenna chain is shown receiving a second signal that includes symbols t7*, −t6*, t5*, −t4*, t3*, −t2*, t1*, and −t0*. Additionally, FIG. 17 shows the first and second signal in the frequency domain at a point after being processed by a respective DFT (FFT) but before an IDFT (IFFT). Further, in view of what is shown, it may be appreciated that, because t0, t1, . . . , t7 (QPSK time domain modulated symbols) has a low PAPR, (+1+j, +1−j, −1+j, −1−j, −1−j, −1+j, −1−j, −1+j) t7*, −t6*, may also has low PAPR.

FIG. 18 illustrates an example of frequency domain signals at a receiver side of a wireless system, in accordance with aspects of the present disclosure.

Specifically, FIG. 18 shows each of the symbols of a receive signal s0, s1, s2, s3, s4, s5, s6, and s7 also including an h1 value and an h2 value. The h1 value corresponds to a channel (e.g., estimated or actual channel value) from the transmission antenna (Ant 1) to the reception antenna in the receiver side of the wireless system. The h2 value corresponds to a channel (e.g., estimated or actual channel value) from the transmission antenna (Ant 2) to the reception antenna. In this example as shown a flat channel is provided but not limited thereto.

Figure 19:
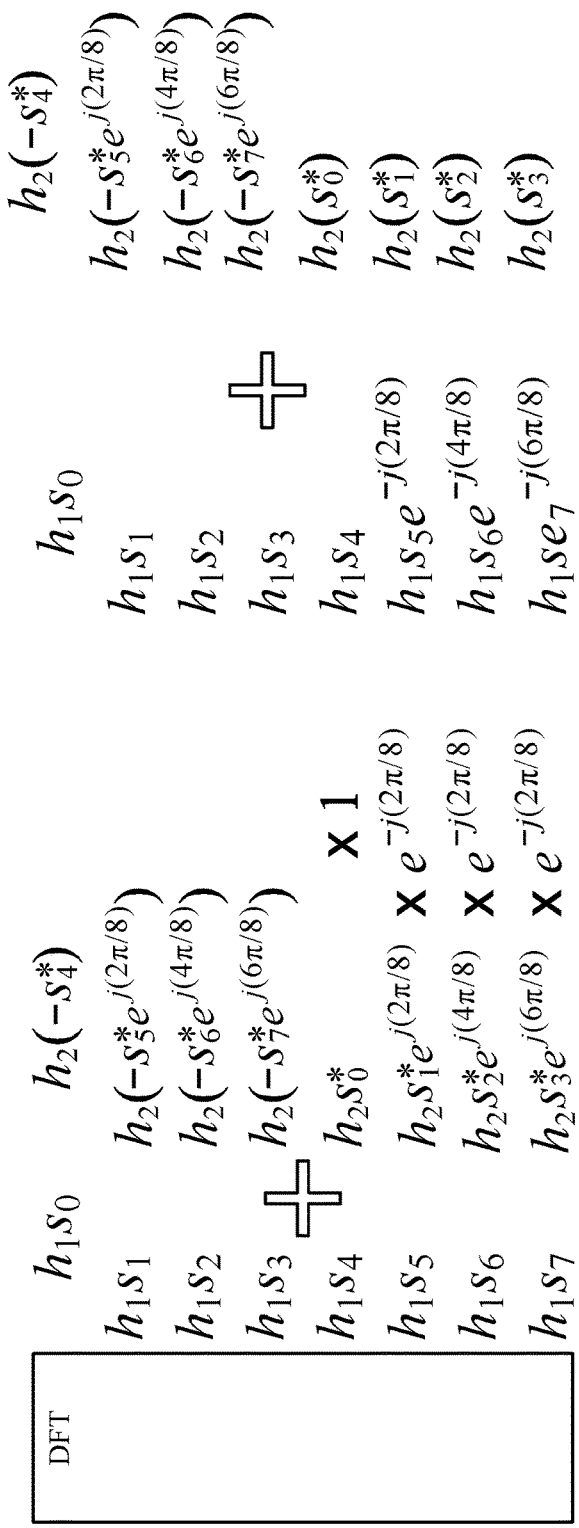
FIG. 19 illustrates an example of frequency domain signals at a receiver side of a wireless system, in accordance with aspects of the present disclosure.

FIG. 19 illustrates another example of frequency domain signals at a receiver side of a wireless system, in accordance with aspects of the present disclosure.

FIG. 19 shows each of the symbols of a first received signal s0, s1, s2, s3, s4, s5, s6, and s7 also including an h1 value and an h2 value. The h1 value corresponds to a channel from the transmission antenna (Ant 1) to the reception antenna in the receiver side of the wireless system. The h2 value corresponds to a channel from the transmission antenna (Ant 2) to the reception antenna. Additionally, a second signal is also shown that includes symbols that each includes at least one of an h1 and h2 value from the corresponding channel through which they travelled.

Figure 20:
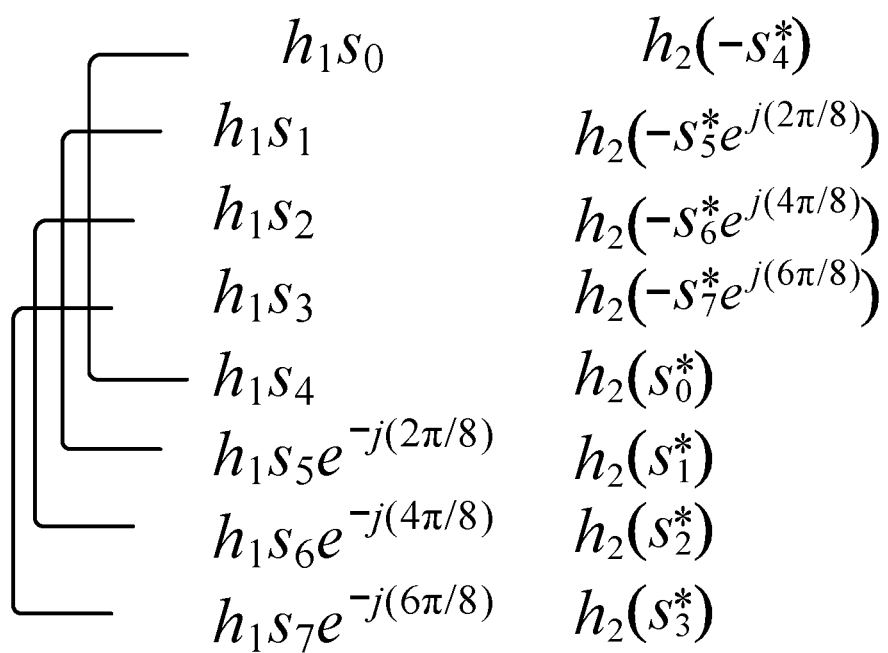
FIG. 20 illustrates an example of frequency domain signals, in accordance with aspects of the present disclosure.

FIG. 20 illustrates an example of frequency domain signals, in accordance with aspects of the present disclosure. As shown, tone-wise Alamouti may be provided through the corresponding symbols and Alamouti pairs.

FIG. 21 illustrates an example of time domain signal schemes, in accordance with aspects of the present disclosure. As shown, a first and second signal for transmission on a first and second antenna (Ant 1 and Ant 2) may each of a variable total length as indicated while still maintaining a continuous index and a continuous phase. Specifically, time-domain sample wise Alamouti is provided along with the continuous index and phase. Due to these properties, one may achieve tone-wise Alamouti in the frequency domain.

FIG. 22 illustrates another example of frequency domain signals at a receiver side of a wireless system, in accordance with aspects of the present disclosure. As shown, FIG. 22 shows each of the symbols of a receive signal s0, s1, s2, s3, s4, s5, s6, and s7 also including an h1 value and an h2 value. The h1 value corresponds to a channel from the transmission antenna (Ant 1) to the reception antenna in the receiver side of the wireless system. The h2 value corresponds to a channel from the transmission antenna (Ant 2) to the reception antenna.

In aspects, in this manner, a transmitting entity may employ time-domain sample wise Alamouti (e.g., as described above) having a continuous index and a same phase rotation when transmitting signals from two antennas, and a receiving entity may employed Alamouti decoding to decode such signal (e.g., received from a single antenna). In aspects, such transmission may achieve full rate coding.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1300 illustrated in FIG. 13 correspond to means 1300A illustrated in FIG. 13A.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for providing, means for encoding, means for flipping, means for conjugating, means for phase rotating, means for employing, means for retaining, means for selecting, and/or means for adding may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication comprising:
providing a first signal configured to be transmitted by a first antenna and a second signal configured to be transmitted by a second antenna; and
encoding the second signal in a time domain that provides a tone-wise Alamouti signal in a frequency domain by flipping an order of symbols in the second signal, phase rotating every other symbol in the second signal by 180 degrees, and conjugating the second signal.

2. The method of claim 1, wherein encoding the second signal comprises:
encoding the second signal with a continuous index and continuous phase that provides for the tone-wise Alamouti signal in the frequency domain.

3. A method of wireless communication comprising:
employing Alamouti encoding in a time domain for one or more portions of a plurality of modulated symbols that are each based on a different constellation selected from a group that includes at least pi/2-BPSK and pi/4-QPSK associated with a first signal to be transmitted by a first antenna and a second signal to be transmitted by a second antenna to create a first plurality of encoded symbols and a second plurality of encoded symbols;
retaining sequential symbol order for the second plurality of encoded symbols; and
employing a constant phase rotation for the second plurality of encoded symbols.

4. The method of claim 3, further comprising:
transmitting the first signal based on the first plurality of encoded symbols from the first antenna; and
transmitting the second signal based on the second plurality of encoded symbols from the second antenna.

5. The method of claim 3, wherein:
the plurality of modulated symbols are based on a constellation, and
the constellation is selected from a group that includes at least QAM and PSK.

6. The method of claim 3, further comprising employing at least one of 4-QAM or QPSK to create the plurality of modulated symbols.

7. A method of wireless communication comprising:
selecting at least two antennas of a user equipment having more than two antennas to transmit a first signal and a second signal respectively;
employing Alamouti encoding to create a plurality of encoded symbols associated with the first signal to be transmitted by a first antenna of the at least two antennas and a plurality of encoded symbols associated with a second signal to be transmitted by a second antenna of the at least two antennas; and
adding a phase ramp in a frequency domain to at least one of the first signal and the second signal.

8. The method of claim 7, wherein selecting at least two antennas of a user equipment having more than two antennas to transmit a first signal and a second signal includes selecting based on channel qualities associated with the more than two antennas, respectively.

9. A method of wireless communication comprising:
selecting at least two antennas of a user equipment having more than two antennas to transmit a first signal and a second signal respectively;
employing Alamouti encoding to create a plurality of encoded symbols associated with the first signal to be transmitted by a first antenna of the at least two antennas and a plurality of encoded symbols associated with a second signal to be transmitted by a second antenna of the at least two antennas;
transmitting the first signal using the first antenna;
transmitting the second signal using the second antenna;
transmitting a third signal using a third antenna of the more than two antennas, wherein the third signal is a version of the first signal with a first cyclic shift; and transmitting a fourth signal using a fourth antenna of the more than two antennas, wherein the fourth signal is a version of the second signal with a second cyclic shift.

10. An apparatus for wireless communication comprising:
means for providing a first signal configured to be transmitted by a first antenna and a second signal configured to be transmitted by a second antenna; and
means for encoding the second signal in a time domain that provides a tone-wise Alamouti signal in a frequency domain comprising:
means for flipping an order of symbols in the second signal;
means for conjugating the second signal; and
means for phase rotating every other symbol in the second signal by 180 degrees.

11. The apparatus of claim 10, wherein encoding the second signal comprises:
means for encoding the second signal with a continuous index and continuous phase that provides for the tone-wise Alamouti signal in the frequency domain.

* * * * *